(12) United States Patent
Brandt et al.

(10) Patent No.: US 10,068,129 B2
(45) Date of Patent: Sep. 4, 2018

(54) RECOGNIZING UNKNOWN PERSON INSTANCES IN AN IMAGE GALLERY

(71) Applicant: Adobe Systems Incorporated, San Jose, CA (US)

(72) Inventors: Jonathan Brandt, Santa Cruz, CA (US); Zhe Lin, Fremont, CA (US); Xiaohui Shen, San Jose, CA (US); Haoxiang Li, Hoboken, NJ (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 135 days.

(21) Appl. No.: 14/945,198

(22) Filed: Nov. 18, 2015

(65) Prior Publication Data

US 2017/0140213 A1    May 18, 2017

(51) Int. Cl.
  *G06K 9/00*  (2006.01)
  *G06K 9/62*  (2006.01)
  *G06K 9/66*  (2006.01)
(52) U.S. Cl.
  CPC ....... *G06K 9/00295* (2013.01); *G06K 9/6218* (2013.01); *G06K 9/66* (2013.01)
(58) Field of Classification Search
  CPC ..... G06K 9/00295; G06K 9/6218; G06K 9/66
  See application file for complete search history.

(56) References Cited

U.S. PATENT DOCUMENTS 8,655,070 B1 *  2/2014  Yang ................. G06K 9/00657
                                              382/100

9,317,781 B2 *  4/2016  Tu ..................... G06K 9/6259
2006/0242567 A1 * 10/2006  Rowson ........... G06F 17/30244
                                              715/209

(Continued)

FOREIGN PATENT DOCUMENTS

WO    WO 2015133206 A1 *  9/2015  ......... G06K 9/00382

OTHER PUBLICATIONS

N. Zhang, M. Paluri, Y. Taigman, R. Fergus, and L. Bourdev. Beyond frontal faces: Improving person recognition using multiple cues. In The IEEE Conference on Computer Vision and Pattern Recognition (CVPR), Jun. 2015.

*Primary Examiner* — Chan Park
*Assistant Examiner* — Elisa Rice
(74) *Attorney, Agent, or Firm* — Keller Jolley Preece

(57) ABSTRACT

Methods and systems for recognizing people in images with increased accuracy are disclosed. In particular, the methods and systems divide images into a plurality of clusters based on common characteristics of the images. The methods and systems also determine an image cluster to which an image with an unknown person instance most corresponds. One or more embodiments determine a probability that the unknown person instance is each known person instance in the image cluster using a trained cluster classifier of the image cluster. Optionally, the methods and systems determine context weights for each combination of an unknown person instance and each known person instance using a conditional random field algorithm based on a plurality of context cues associated with the unknown person instance and the known person instances. The methods and systems calculate a contextual probability based on the cluster-based probabilities and context weights to identify the unknown person instance.

20 Claims, 7 Drawing Sheets

(56) References Cited

U.S. PATENT DOCUMENTS

| | | | | |
|---|---|---|---|---|
| 2007/0237355 A1* | 10/2007 | Song | .................. | G06K 9/00369 |
| | | | | 382/100 |
| 2008/0089561 A1* | 4/2008 | Zhang | ............... | G06F 17/30259 |
| | | | | 382/118 |
| 2010/0260419 A1* | 10/2010 | Katoh | ...................... | H04N 1/60 |
| | | | | 382/167 |
| 2013/0212047 A1* | 8/2013 | Lai | ....................... | G06Q 10/107 |
| | | | | 706/12 |
| 2017/0061482 A1* | 3/2017 | Guo | .................. | G06Q 30/0255 |
| 2017/0083920 A1* | 3/2017 | Zoldi | ................. | G06Q 20/4016 |

\* cited by examiner

RECOGNIZING UNKNOWN PERSON INSTANCES IN AN IMAGE GALLERY

BACKGROUND

1. Technical Field

One or more embodiments relate generally to systems and methods for person recognition. More specifically, one or more embodiments relate to systems and methods of recognizing unknown person instances in images of an image gallery.

2. Background and Relevant Art

Digital photography and increasing digital storage sizes allow users to take large numbers of digital photographs. Images captured within certain time frames or at similar locations are typically related to each other, and often include many of the same people. Labeling or tagging people within the images, however, is frequently burdensome and time consuming. For example, manually tagging people across many images in many different albums can be a large task that deters users from tagging people in more than a few of the images.

To alleviate the burden of tagging people in images, some conventional recognition systems automatically find and recognize faces in images. Specifically, the conventional recognition systems can use automatic facial recognition to predict the identity of a face given a set of images including the face and one or more manually labeled images. For example, some conventional recognition systems automatically recognize one or more faces in an image and tag the images with metadata associated with the automatically recognized face(s). Alternatively, other conventional recognition systems recognize faces and provide a recommendation of the recognized faces to a user.

Although conventional recognition systems are able to use facial recognition to automatically predict the identity of a person using facial features, such systems can often be limited in accuracy and ability to provide a prediction. In particular, in real-world applications, developing a facial recognition system that is able to account for large interpersonal variations due to pose changes, occlusion, low image quality, etc., can be challenging. Additionally, conventional recognition systems are often unable to differentiate multiple identities when interpersonal variations of faces are subtle. Furthermore, facial recognition is typically unable to automatically recognize people in images when only part or none of a person's face is visible in an image. Thus, conventional systems that use facial recognition alone are often unable to correctly identify faces and people in many instances.

Other conventional recognition systems use other information instead of, or in addition to, facial features to recognize people in images. Specifically, some conventional recognition systems use poselet detectors and/or holistic image features to detect people in images. For example, the conventional systems use body pose information to recognize a person in multiple images based on the similar pose information. Such conventional systems improve person recognition accuracy over systems that use facial recognition alone, but are impractical due to the computational costs associated with poselet detection and poselet feature evaluation.

These and other disadvantages may exist with respect to conventional recognition techniques.

SUMMARY

One or more embodiments include systems and methods for recognizing people in images with increased accuracy. For example, one or more embodiments determine a probability that an unknown person instance in an image is a known person instance. Specifically, one or more embodiments divide images of an image gallery into image clusters based on common characteristics of the images and train a cluster classifier for each image cluster based on known person instances. One or more embodiments determine an image cluster to which an image with an unknown person instance belongs based on characteristics of the image and the determined image cluster. Using the cluster classifier of the image cluster, one or more embodiments determine a probability that the unknown person instance is each known person instance in the image cluster.

Additionally, the systems and methods determine an identity of an unknown person instance based on a plurality of context cues from the image gallery. In particular, one or more embodiments identify the context cues between the unknown person instance and known person instances or between the known person instances. Furthermore, one or more embodiments determine a context weight for combinations of the unknown person instance and each known person instance using a conditional random field based on the context cues. This allows various embodiments to calculate a contextual probability based on the cluster-based probabilities and the context weights, and identify the unknown person instance as a known person instance with the highest contextual probability. Thus, one or more embodiments determine the most likely identity of an unknown person instance in an image by leveraging context information from the images of an image gallery.

Additional features and advantages of one or more embodiments of the present disclosure will be set forth in the description which follows, and in part will be obvious from the description, or may be learned by the practice of such example embodiments.

BRIEF DESCRIPTION OF THE DRAWINGS

Various embodiments will be described and explained with additional specificity and detail through the use of the accompanying drawings in which.

DETAILED DESCRIPTION

Figure 1:
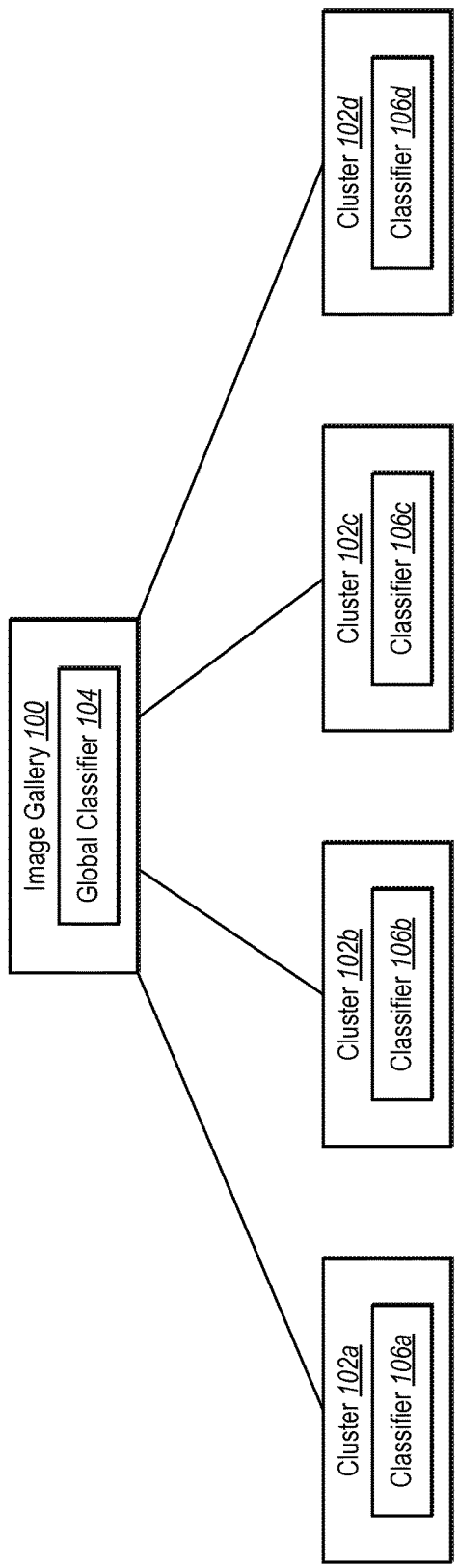
FIG. 1 illustrates a schematic diagram of one embodiment of a plurality of image clusters in an image gallery in accordance with one or more embodiments.

One or more embodiments of the present disclosure include a person recognition system that recognizes people in images with increased accuracy and speed. In one or more embodiments, the person recognition system associates one or more unknown people in an image with one or more known people of an image gallery. In particular, the person recognition system uses cluster-based recognition and/or contextual information from the images of the image gallery to identify an unknown person as one of a plurality of known people from the image gallery. To illustrate, the person recognition system uses manually provided information (e.g., a set of manually labeled people) from an image gallery to label unknown people in the image gallery using the cluster-based recognition and contextual information.

In one or more embodiments, the person recognition system groups images of an image gallery into a plurality of image clusters. Specifically, the person recognition system divides the images into a plurality of clusters including images with common characteristics. For example, common characteristics can include visual characteristics (e.g., color schemes, scenes, or backgrounds) location, serial or sequence numbers, timestamps, and/or other visual or metadata information. The person recognition system trains a cluster classifier for each cluster to provide more accurate recognition of unknown people within a given cluster. For example, the person recognition system trains the cluster classifiers using known people in the corresponding clusters.

Additionally, the person recognition system determines a cluster to which an image most corresponds for applying the appropriate cluster classifier(s). In particular, the person recognition system assigns an image with an unknown person to a cluster based on the characteristics of the image and common characteristics of the cluster. The person recognition system determines a probability that an unknown person is each known person in a cluster using the cluster classifier of the cluster to which the image is assigned. Thus, the person recognition system can provide accurate and fast person recognition by limiting the number of known people and/or characteristics that the system uses to identify the unknown person.

In one or more embodiments, the person recognition system identifies context cues between the unknown person and known people or context cues between the known people. For example, the context cues can include an assumption that a single person cannot appear in the same image more than once. Additionally, the context cues can include an assumption that two known people that appear together in the same image at least once in the image gallery are more likely to appear together in other images.

According to one or more embodiments, the person recognition system uses the context cues to apply context weights to combinations of an unknown person and each of the known people in the image gallery. Specifically, the person recognition system can determine a context weight below a default context weight for a known person appearing in the same image more than once. Additionally, the person recognition system can determine a context weight above the default context weight for a combination of two known people appearing in the same image if the two known people have appeared in the same image previously. The person recognition system can apply the default context weight for all other combinations.

In one or more embodiments, the person recognition system determines a contextual probability that the unknown person is each known person. In particular, the person recognition system combines the probabilities from the cluster-based recognition with the context weights from the context cues to obtain the contextual probabilities. The person recognition system uses the contextual probabilities to identify the unknown person as one of the known people in the image gallery. For example, the person recognition system identifies the unknown person as the known person with the highest contextual probability. The person recognition system can also jointly identify a plurality of unknown people in an image using the context cues and contextual probabilities.

As used herein, the term "person instance" refers to a person in an image. For example, a known person instance can include a person in an image that the person recognition system or a user has previously labeled (e.g., via metadata in the image). In one or more embodiments, a known person instance can be a person instance that a user has manually labeled in an image of an image gallery. Additionally, an unknown person instance can include a person in an image that the person recognition system or user has not previously labeled or identified.

As used herein, the term "cluster classifier" refers to a classifier for determining a probability that an unknown person instance is a known person instance within an image cluster. The person recognition system trains a cluster classifier based on features of known person instances in the corresponding cluster. For example, the person recognition system can train a support vector machine to recognize one or more specific features associated with a classifier. In one or more embodiments, an image cluster can include one or more cluster classifiers for use in determining a probability that an unknown person instance is a known person instance.

As used herein, the term "context cue" refers to contextual information from an image or a set of images. Specifically, a context cue can include contextual information that takes into account a plurality of person instances within a single image. For example, a context cue can include contextual information that relates to relationships between known person instances and/or unknown person instances. To illustrate, a context cue can include a mutual exclusion cue indicating that a single person instance can only appear once in an image. In one or more embodiments, a context cue can include a person co-occurrence cue indicating that known persons appearing together in an image have an increased probability of appearing together in other images.

FIG. 1 illustrates a schematic representation of an image gallery 100. Specifically, the image gallery 100 includes a plurality of images that include one or more person instances. For example, the image gallery 100 can include known person instances and unknown person instances. To illustrate, a user can manually label one or more known person instances in one or more images of the image gallery 100. As described in more detail below, the labeled known person instances allow the person recognition system to predict the identities of unknown person identities in the images of the image gallery 100.

According to one or more embodiments, the person recognition system extracts features for training the person recognition system to use in identifying unknown person instances across all of the images of the image gallery 100. In particular, the person recognition system extracts at least one feature for every known person instance in the image gallery 100. For example, the person recognition system extracts one or more facial features or body features of the known person instances in the image gallery 100. The person recognition system uses the extracted features to train a global classifier 104 for the entire image gallery 100 using machine learning techniques.

To further increase the accuracy and speed of person identification, the person recognition system divides the images of the image gallery 100 into a plurality of image clusters 102a, 102b, 102c, 102d (or simply "clusters").

Specifically, the person recognition system divides the images into a plurality of clusters 102a-d based on characteristics of the images. For example, the person recognition system can use a clustering algorithm (such as k-means, fuzzy c-means, hierarchical clustering, probabilistic clustering, etc.) to divide the images into clusters 102 of images sharing common characteristics. To illustrate, the person recognition system can divide the images based on common characteristics, such as visual characteristics, location, serial or sequence numbers, timestamps (e.g., on the same day or within the same week), and/or other visual or metadata information. In another example, the person recognition system can divide the images into clusters based on information associated with already existing clusters, such as existing image albums that the person recognition system or a user created.

As explained more fully below, the use of clusters allows the person recognition system to leverage the consistency of persons within a cluster. For example, in a cluster consisting of beach photos, a given person may wear the same bathing suit. This in-cluster characteristic can allow the person recognition system to identify instances of this person even when the face of the person is not visible. Thus, clustering can allow the person recognition system to interpersonal variations due to the pose changes, occlusion, low image quality, etc.

The person recognition system also trains a cluster classifier 106a, 106b, 106c, 106d for each cluster 102a-d. In particular, the person recognition system uses the known person instances within a cluster 102a to train the cluster classifier 106a for the cluster 102a. For example, the person recognition system can use one or more features of the known person instances in a cluster 102a to train a cluster classifier 106a for the cluster 102a. Thus, the cluster classifier 106a is based on the feature(s) of the known person instances in the specific cluster 102a for use in classifying images corresponding to the cluster 102a.

In one or more embodiments, if the person recognition system is unable to generate a cluster classifier for a given cluster due to insufficient known person instances or sparse data, the person recognition system can assign the global classifier 104 to the cluster until the cluster. Alternatively, the person recognition system can assign a cluster classifier from another cluster to the cluster. For example, the person recognition system can identify a similar cluster based on time or visual similarities.

Once the person recognition system has assigned cluster classifiers 106a-d to the clusters 102a-d in the image gallery 100, the person recognition system recognizes, or receives a query for, an image that includes at least one unknown person. The person recognition system identifies a cluster 102a to which the image most corresponds based on the characteristics of the image and the cluster 102a. For example, the person recognition system can assign the image to a cluster 102a based on a comparison of one or more characteristics of the image to one or more characteristics of the clusters 102a-d in the image gallery 100. By identifying the cluster 102a to which the image most corresponds, the person recognition system can narrow the amount of processing power required to determine an identity of the unknown person instance in the image. Furthermore, by using the cluster classifier 106a rather than the global classifier 104, the person recognition system can identify the unknown person instance in the image with increase accuracy. Using the cluster classifier 106a, the person recognition system determines probabilities that the unknown person instance is one of a plurality of known person instances in the cluster 102a.

In instance in which the person recognition system is unable to generate a cluster identifier for a given cluster to which an image with an unknown person instance corresponds, the person recognition system can use one or more other cluster identifiers 106a-106d. In particular, the person recognition system can use the cluster classifiers 106a-106d from a plurality of clusters 102a-102d to predict an identity of the unknown person instance. For example, the person recognition system can select the cluster classifier(s) 106a-106d from similar clusters to use in predicting the identity of the unknown person instance. For instance, the person recognition system uses the cluster classifiers 106a-106d for clusters 102a-102d within a threshold distance of the image. Alternatively, the person recognition system can use the cluster classifiers 106a-106d from a predetermined number of clusters 102a-102d (e.g., the closest three or four clusters).

Figure 2:
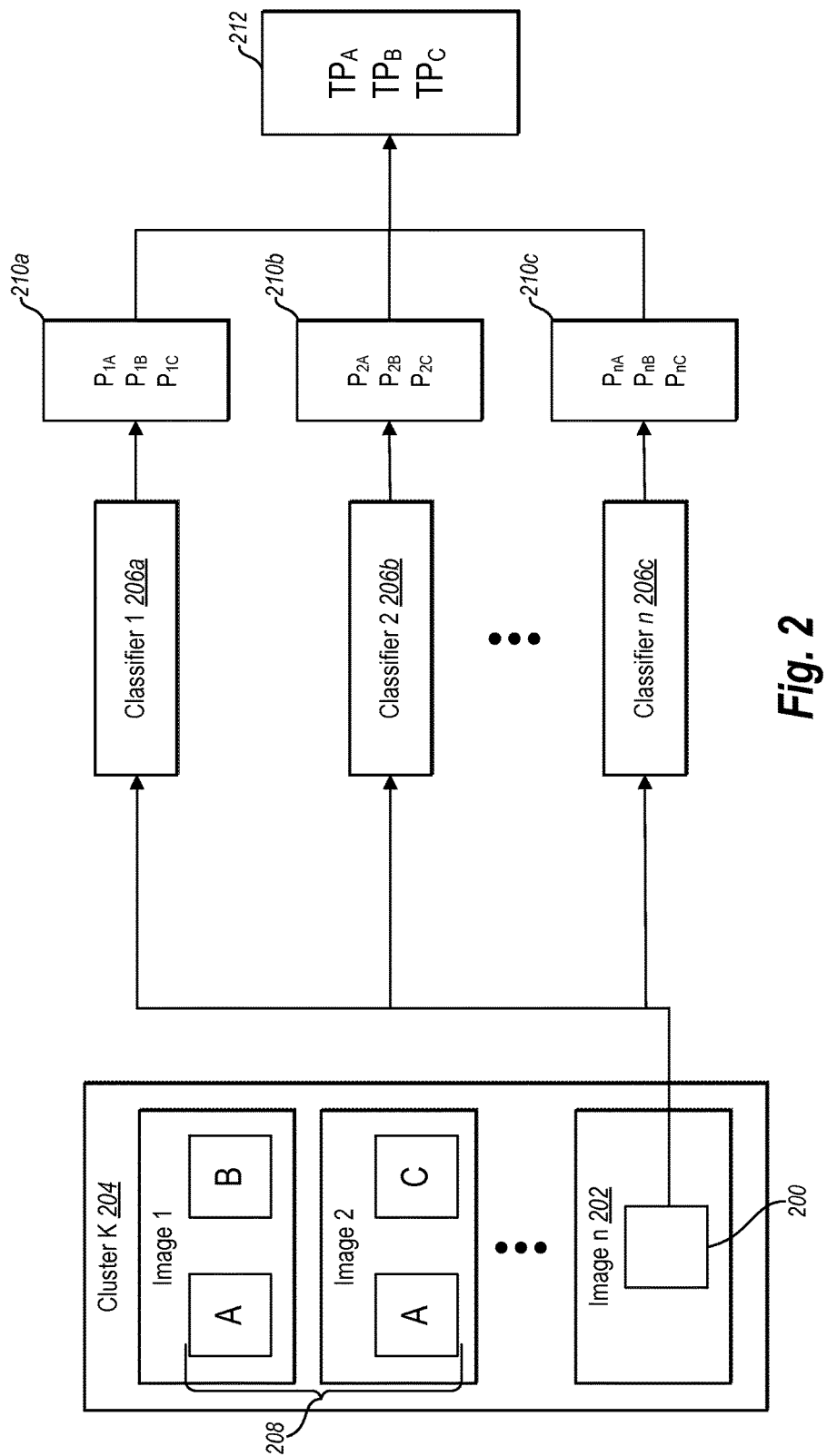
FIG. 2 illustrates a schematic diagram of one embodiment of cluster-based person recognition in accordance with one or more embodiments.

In one or more embodiments, the person recognition system predicts the identity of the unknown person instance in the image based on the cluster classifier of the cluster to which the image corresponds. In particular, the cluster classifier outputs a probability that the unknown person instance is each of the known person instances in the cluster. For example, the person recognition system compares the unknown person instance to each of the known person instances using the cluster classifier and generates a probability for each combination of the unknown person instance and the known person instances. FIG. 2 illustrates an embodiment of cluster-based recognition for identifying one or more unknown person instances 200 in an image 202 of an image cluster 204 using one or more cluster classifiers 206a-206c.

According to one or more embodiments, the person recognition system can determine a plurality of probabilities for each combination of the unknown person instances 200 and the known person instances 208 (e.g., known person A, known person B, and known person C). For example, the person recognition system can determine a plurality of probabilities 210a-210c based on a plurality of cluster classifiers 206a-206c. More specifically, rather than a cluster having a single cluster classifier, in or more embodiments, each cluster can have a plurality of associated cluster classifiers trained based on different image features.

To illustrate, the plurality of cluster classifiers 206a-206c can be associated with a plurality of different features of the known person instances 208. For instance, the plurality of classifiers 206a-206c can include a face classifier 206a associated with facial appearances, a body classifier 206b associated with body appearances, a clothing classifier 206c associated with clothing appearances, or other clusters associated with other image features. Using the cluster classifiers 206a-206c for the image cluster 204, the person recognition system can identifier a probability that the unknown person instance 200 is a given known person instance A, B, C based on a given feature or set of features corresponding to a given cluster classifier 206a-206c. For example, using the facial classifier 206a, the person recognition system uses a neural network, such as a convolutional neural network, to determine a probability $P_{1A}$ that the unknown person instance is known person instance A based on facial features. Similarly, the person recognition system similarly determines a probability $P_{1B}$ that the unknown person instance is known person instance B based on facial features. Furthermore, the person recognition system determines a probability $P_{1C}$ that the unknown person instance is known person instance C based on facial features.

Along related lines, using the body classifier 206b, the person recognition system uses a neural network, such as a convolutional neural network, to determine a probability $P_{2A}$ that the unknown person instance is known person instance A based on body features. Similarly, the person recognition system similarly determines a probability $P_{2B}$ that the unknown person instance is known person instance B based on body features. Furthermore, the person recognition system determines a probability $P_{2C}$ that the unknown person instance is known person instance C based on body features.

If there are further cluster classifiers associated with the image cluster 204, the person recognition system can identify further probabilities. For example, using the cluster classifier 206c, the person recognition system uses a neural network, such as a convolutional neural network, to determine a probability $P_{nA}$ that the unknown person instance is known person instance A. Similarly, the person recognition system similarly determines a probability $P_{nB}$ that the unknown person instance is known person instance B. Furthermore, the person recognition system determines a probability $P_{nC}$ that the unknown person instance is known person instance C.

After determining the plurality of probabilities 210a-210c, the person recognition system can combine the probabilities 210a-210c (e.g., a weighted average for which the sum of the weight is one) for each combination to obtain a total probability 212 that the unknown person instance is each of the known person instances A, B, or C in the image cluster 204. One will appreciated the user of multiple cluster classifiers based on different image features (e.g., facial features, body features, clothing features, etc.) can increase the accuracy of person recognition. For example, due to pose changes, occlusion, low image quality, etc. the probability $P_{1A}$ that the unknown person instance 200 is the known person instance A based on facial features may be relatively low indicating a likelihood that the unknown person instance is not known person instance A. The probability $P_{2A}$ that the unknown person instance 200 is the known person instance A based on body features may be relatively high. Thus, the total probability $TP_A$ that the unknown person instance 200 is the known person instance A may indicate that the unknown person instance 200 is the known person instance A despite the low probability $P_{1A}$.

The foregoing overview of cluster-based person recognition indicates various advantages. A more detailed description of one embodiment of cluster-based person recognition will now be described. As mentioned previously, the person recognition system extracts one or more features (the extracted feature denoted as F(x)) for all known person instances (a known person instance denoted as x). In one or more embodiments, the person recognition system first trains a global multi-class classifier $\mathcal{F}_g$ with all available known person instances.

Given a set of images (e.g., a collection of photos), the system generates clusters of images to separate them into sets of images in various contexts. In at least some embodiments, the system can use a hand-crafted feature extraction algorithm. For example, the clustering is based on holistic image features extracted with a pre-trained convolutional neural network. When additional information, such as an owner of the image set, the clustering can be based on already existing algorithms—i.e., making each photo album a separate photo cluster.

After obtaining the image clusters, the person recognition system trains a multi-class classifier for each cluster when the cluster contains enough known person instances to extract one or more features. Thus, with C clusters, the system can potentially train C multi-class classifiers $\mathcal{F}_{g_k}$, k=[1, C]. If the k-th cluster does not contain sufficient training data to train the parameters of a multi-class classifier, the system can set $\mathcal{F}_{g_k} = \mathcal{F}_g$.

Given a probe instance (i.e., an unknown person instance) x, the person recognition system can calculate a soft assignment over all of the clusters {p(k|x)} based on the distance of x to each cluster {d(x,k)}. Denoting the k-th cluster of images as $I_k$ and an image including the unknown person instance x as I(x), the system obtains a distance function represented as:

$$d(x,k) = \min_{i \in I_k} \text{distance}(I(x), i).$$

The distance function can determine an Euclidean distance between features of the image i containing a known person instance and I(x). In one or more embodiments, the person recognition system can use a specific network or machine learning system to extract a neural network feature of the image, which the system can use to determine the most likely cluster to which the image corresponds:

$$p(k \mid x) = \frac{\exp(-d^2(x, k)/\sigma)}{\sum_{k'} \exp(-d^2(x, k')/\sigma)}.$$

To predict the identity of an unknown person instance x, the person recognition system applies a cluster classifier (e.g., classifier 1) from the k-th cluster to obtain p(y|F(x),k). In one or more embodiments, p(y|F(x),k) includes two parts: the outputs of the classifier $\mathcal{F}_{g_k}$ and the prior p(y|k) within the k-th cluster. Denoting the known person instances in the k-th cluster as $X_k$ and the identity label of the unknown person instance x as $\mathcal{Y}(x)$ results in:

$$p(y \mid k) = T\delta\left(\sum_{x \in X_k} \delta(y = \mathcal{Y}(x)) > 1\right),$$

in which T is a constant. Thus, the system obtains:

$$p(y \mid F(x), k) = \frac{1}{Z} p(y \mid k) \mathcal{F}_k(F(x)),$$

in which Z is a normalization term to make p(y|F(x),k) a probability value. Furthermore, the person recognition system applies all cluster classifiers for the k-th cluster to the unknown person instance x to obtain the predicted posterior probabilities over the identity y (i.e., an identity of one of the known person instances), represented as:

$$p(y \mid x) = \sum_k p(y \mid F(x), k) p(k \mid x).$$

Figure 3:
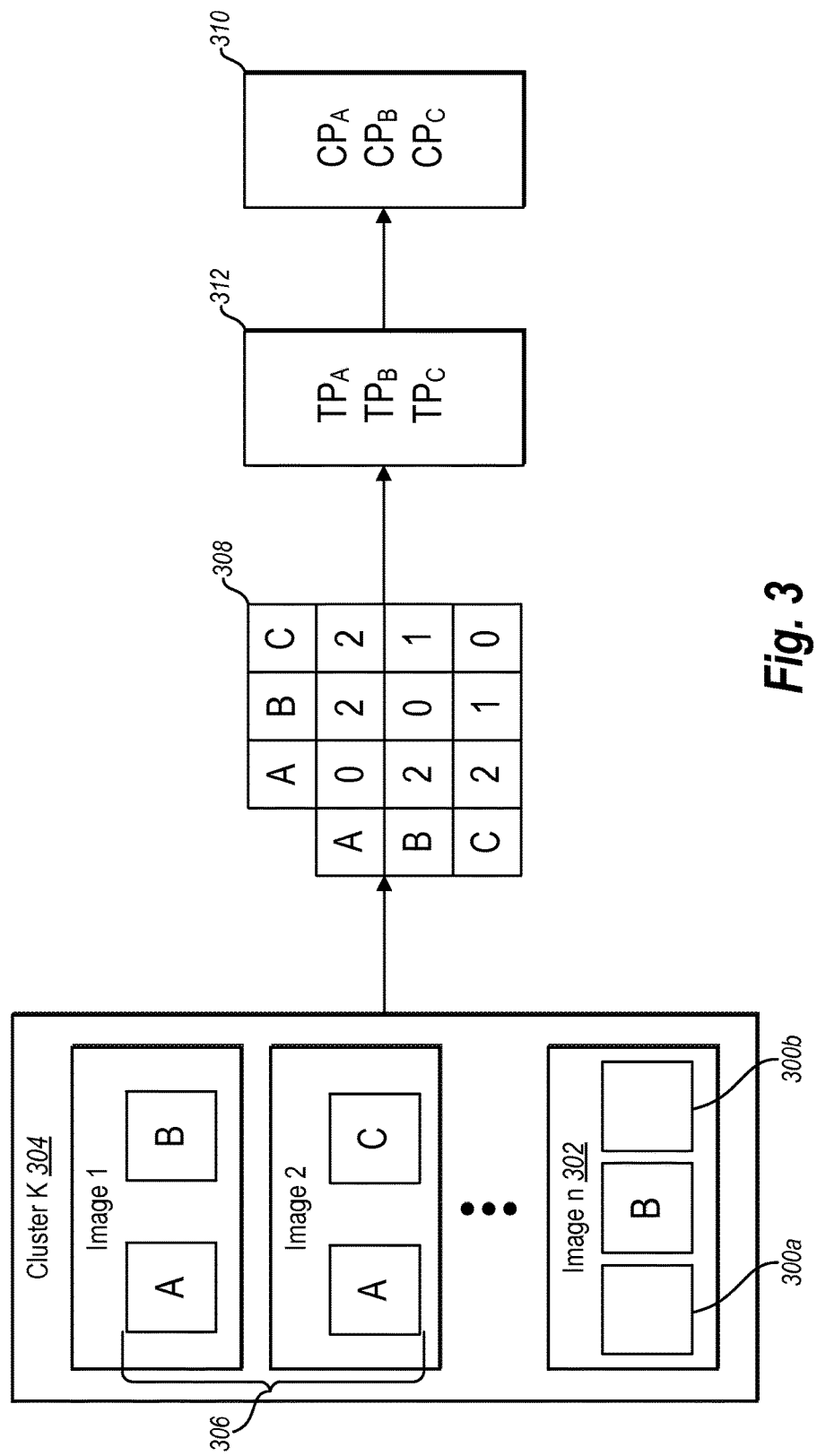
FIG. 3 illustrates a schematic diagram of one embodiment of joint person recognition of a plurality of person instances in accordance with one or more embodiments.

As described above, the person recognition system can use the cluster-based recognition to reduce a solution space for a particular unknown person instance. The cluster-based recognition, however, processes the unknown person instance for each known person instance independently. The person recognition system can use cross-instance information associated with a plurality of known person instances to inform the identification of the unknown person instance. Specifically, the person recognition system can leverage context information associated with the plurality of known person instances in an image cluster to improve the accuracy of identity prediction. For example, FIG. 3 illustrates an embodiment of a schematic diagram in which the person recognition system identifies a plurality of unknown person instances 300a, 300b in an image 302 of an image cluster 304.

For example, the person recognition system identifies context cues associated with the known person instances 306 in the cluster. In particular, the context cues can be associated with likelihoods that person instances will appear together in images. To illustrate, the context cues can include a mutual exclusion context cue corresponding to a probability that a particular person instance will appear more than once in a single image. Although not impossible (e.g., due to mirrors, reflections, photographs within an image), it is unlikely that a single known person instance will appear in the same image more than once. Thus, the person recognition system can leverage this assumption and assign a lower weight (e.g., lower than a default weight) to the plurality of unknown person instances 300a, 300b in the image 302 being the same known person instance.

In one or more embodiments, the context cues can include a person co-occurrence context cue corresponding to a probability that two people will be together in a single image. For example, the person recognition system can determine that when two known person instances appear together in the same image, the two known person instances are more likely to appear together in other images in the image cluster. The person recognition system can assign a higher weight (e.g., higher than the default weight) to a plurality of unknown person instances in an image being specific known person instances if the known person instances have previously appeared together in an image. In one example, the person recognition system can assign a variable weight based on how many images in which the known person instances appear together.

For example, the person recognition system can leverage the context information using a conditional random field (CRF) algorithm to jointly predict a plurality of unknown person instances in an image. Specifically, as illustrated in a label compatibility matrix 308 in FIG. 3, the person recognition system assigns a default weight (e.g., "1") to combinations between the unknown person instances and known person instances or between known person instances. Additionally, the person recognition system can assign a lower weight (e.g., "0") to a combination of a single known person instance with the same single known person instance (e.g., the same person being in the same image twice). The person recognition system assigns a higher weight (e.g., "2") to a combination of known person instances that appear together in at least one other image in the image gallery 100. By assigning weights to the various combinations of unknown person instances and known person instances, the person recognition system can jointly infer identities of all unknown person instances in an image based on the context information inherent in the image.

In one or more embodiments, the person recognition system calculates a contextual probability 310 that the unknown person instance is each known person instance. For example, the person recognition system can calculate the contextual probability 310 to account for the cluster-based recognition probabilities and the context weights. To illustrate, the person recognition system can combine the probabilities that the unknown person instance is each of the known person instances (e.g., total probabilities 312 from an instance-based recognition method) with the context weights based on the context cues to obtain the contextual probability 310 that the unknown person instance is each known person instance. The contextual probability 310 provides increased accuracy in determining the identity of the unknown person instance due by taking advantage of the clustering and the contextual information.

As described previously, given an image I and N known person instances $\{x_n\}$, n=[1, N], finding an identity assignment $Y=[y_1, \ldots, y_n]$ over the N instances which maximize the potential E(Y), represented as:

$$E(Y) = \sum_{n=1}^{N} \phi(y_n) + \sum_{n,m} \psi(y_n, y_m).$$

In one or more embodiments, the unary potential $\phi(y_n)$ can be defined as the outputs of an instance-based recognition method, such as the cluster-based recognition method in which $$\phi(y_n)=p(y_n|x).$$

Alternatively, the unary potential $\phi(y_n)$ can use an instance-based recognition other than the cluster-based recognition method.

Additionally, the pairwise potential in the $\psi(y_n,y_m)$ can be defined as the label compatibility independent to the instances:

$$\psi(y_n, y_m) = \frac{1}{Z}\begin{cases} 0 & y_n = y_m, \\ 2(y_n, y_m) & \text{observed in a gallery photo,} \\ 1 & \text{otherwise,} \end{cases}$$

in which Z is a normalization term. The person recognition system can apply a belief propagation for the CRF inference and obtain the identity assignment Y with the maximum potential.

As described with respect to FIG. 3, the person recognition system can use the results of the CRF algorithm to obtain the identity assignment of a plurality of unknown person instances 300a, 300b. Specifically, the CRF algorithm can produce the label compatibility matrix 308, shown in FIG. 3, over all possible identity pairs estimated from the plurality of known person instances 306 in the image gallery 100. The matrix 308 includes the context weights (e.g., "0", "1", or "2") for each of the combinations of person instances.

In one or more embodiments, the person recognition system may not have sufficient information to obtain an accurate estimation when first attempting to identify unknown person instances in an image gallery 100. In particular, a user may not have labeled enough known person instances to produce accurate predictions based on the available prior information. Thus, the person recognition system may use an iterative process that updates the information available to the person recognition system to increase the accuracy of the estimation. To illustrate, the person recognition system can use the CRF algorithm on an updated compatibility matrix after predicting the identities for one or more unknown person instances. Alternatively, the person recognition system can modify or update ground truth information or probability information (including the classifiers of one or more clusters) at any stage of the person recognition process.

Additionally, in one or more embodiments, the person recognition system can assign identities to unknown person instances if a probability meets a threshold. Specifically, the person recognition system compares the highest contextual probability for a certain combination of an unknown person instance and a known person instance to a threshold. If the contextual probability meets or exceeds the threshold, the person recognition system assigns the identity of the known person instance to the unknown person instance. Otherwise, the person recognition system can update one or more aspects of the person recognition process and perform another iteration.

In one or more experimental results over a People in Photo Albums (PIPA) dataset, the person recognition system randomly selects half of the person instances as known person instances from an image gallery 100. The system selects the remaining person instances as unknown person instances. The system trains the classifiers using the known person instances and does not use any identity labels on the unknown person instances. As illustrated in the table below, the performance of the person recognition system at different stages outperforms a conventional poselet recognition method on the PIPA dataset by almost 10%:

| Algorithm | Face Part Accuracy | Body Part Accuracy | Combined Accuracy |
| --- | --- | --- | --- |
| Conventional Poselet Method | 46.66% | 67.60% | 83.05% |
| Baseline | 65.86% | 70.47% | 82.22% |
| Cluster-Based Recognition | 83.47% | 85.57% | 91.21% |
| Single Image CRF | 86.21% | 87.81% | 92.38% |
| Iterative Inference | 86.12% | 88.35% | 92.89% |

Figure 4:
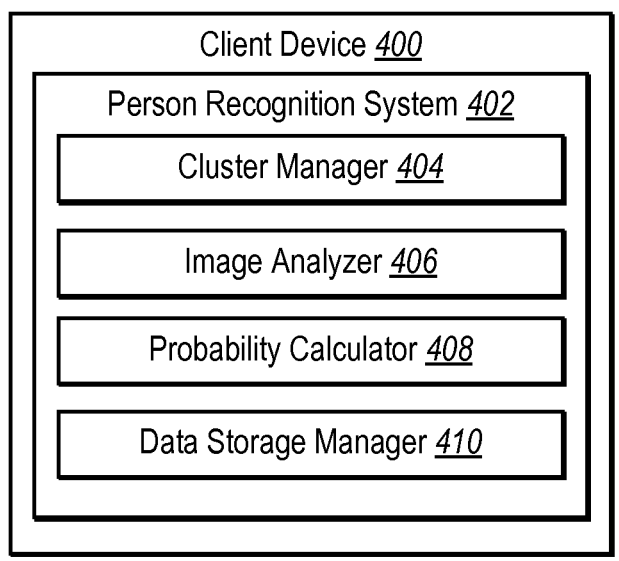
FIG. 4 illustrates a schematic diagram of an embodiment of a client device including a person recognition system in accordance with one or more embodiments.

As described above, a person recognition system can predict an identity of an unknown person instance in an image of an image gallery 100 with known person instances with increased accuracy. FIG. 4 illustrates a schematic diagram of a client device 400 including a person recognition system 402 for performing the person recognition methods described herein. As shown by FIG. 4, the person recognition system 402 includes, but is not limited to, a cluster manager 404, an image analyzer 406, a probability calculator 408, and a data storage manager 410. Although the person recognition system 402 of FIG. 4 is depicted as having various components, the person recognition system 402 may have any number of additional components or different components. For example, the person recognition system 402 can include components for managing user inputs or for managing output (e.g., to a display device).

In one or more embodiments, each of the components of the person recognition system 402 can be in communication with one another using any suitable communication technologies. It will be recognized that although the subcomponents of the person recognition system 402 are shown to be separate in FIG. 4, any of the subcomponents may be combined into fewer components, such as into a single component, or divided into more components as may serve a particular implementation. Furthermore, although the components of FIG. 3 are described in connection with the person recognition system 402, at least some of the components for performing operations in conjunction with the person recognition system 402 described herein may be implemented on other devices.

The components of the person recognition system 402 can include software, hardware, or both. For example, the components of the person recognition system 402 (e.g., the cluster manager 404, the image analyzer 406, the probability calculator 408, and the data storage manager 410, or devices in communication with the components) can include one or more instructions stored on a computer-readable storage medium and executable by processors of one or more computing devices, such as the client device. When executed by the one or more processors, the computer-executable instructions of the person recognition system 402 can cause the computing device(s) to perform the depth correction processes described herein. Alternatively, the components of the person recognition system 402 can comprise hardware, such as a special purpose processing device to perform a certain function or group of functions. The components of the person recognition system 402 can comprise a combination of computer-executable instructions and hardware.

Furthermore, the components of the person recognition system 402 performing the functions described herein with respect to the person recognition system 402 may, for example, be implemented as part of a stand-alone application, as a module of an application, as a plug-in for applications including image processing applications, as a library function or functions that may be called by other applications, and/or as a cloud-computing model. Thus, the components of the person recognition system 402 may be implemented as part of a stand-alone application on a personal computing device or a mobile device. The components of the person recognition system 402 may be implemented in any application that allows delivery of content to users, including, but not limited to, applications in ADOBE® CREATIVE CLOUD®, such as ADOBE® PHOTOSHOP® and ADOBE® BRIDGE®. "ADOBE", "CREATIVE CLOUD", "PHOTOSHOP" and "ADOBE BRIDGE" are registered trademarks of Adobe Systems Incorporated in the United States and/or other countries.

As previously described, the person recognition system 402 can include a cluster manager 404. Specifically, the cluster manager 404 facilitates creation and management of image clusters 102 in an image gallery 100. For example, the cluster manager 404 divides images in the image gallery 100 into a plurality of image clusters 102 based on one or more characteristics of the images. To illustrate, the cluster manager 404 divides the images into clusters based on a timestamp associated with each image. Alternatively, the cluster manager 404 can divide the images into clusters based on predefined divisions of the images (e.g., separate albums).

The cluster manager 404 also manages/generates cluster classifiers for each of the clusters. For example, the cluster manager 404 trains at least one cluster classifier for each image cluster based on a plurality of known person instances in the images of the image cluster. To illustrate, the cluster manager 404 communicates with the image analyzer 406 identify one or more features of the known person instances in an image cluster and train a cluster classifier for the cluster based on the features. In one or more embodiments, the cluster manager 404 trains a plurality of cluster classifiers for each cluster.

The person recognition system 402 also includes an image analyzer 406 to facilitate analysis of images. The image analyzer 406 uses image analysis techniques to identify person instances in the images of the image gallery 100. In particular, the image analyzer 406 uses image analysis techniques to identify features of the person instances in the images or other features of the images in the image gallery 100. Additionally, the image analyzer 406 also compares the features of an image in the image gallery 100 to other images in the image gallery 100 to determine which cluster or clusters most correspond to a given image.

The person recognition system 402 further includes a probability calculator 408 to facilitate determination of probabilities that unknown person instances are known person instances in the image gallery 100. Specifically, the probability calculator 408 determines a probability for each combination of unknown person instances and known person instances. For example, the probability calculator 408 can employ a cluster-based recognition method using cluster classifiers associated with one or more clusters containing images from the image gallery 100.

Additionally, the probability calculator 408 can optionally leverage context information from the image gallery 100 to identify and label unknown person instances in the image gallery 100. For example, the probability calculator 408 uses context cues (e.g., a mutual exclusion context cue and a person co-occurrence context cue) to determine a contextual probability that a specific unknown person instance is a particular known person instance. The contextual probability includes the corresponding probability from the cluster-based recognition method. The probability calculator 408 also performs iterative calculations that use previously calculated probabilities to improve the accuracy of identifying unknown person instances.

The person recognition system 402 includes a data storage manager 410 to manage data that the other components in the person recognition system 402 use and/or produce. Specifically, the data storage manager 410 communicates with the other components in the person recognition system 402 (i.e., the cluster manager 404, the image analyzer 406, and the probability calculator 408) to obtain data that the components have produced for storage and/or use by one or more of the components. To illustrate, the data storage manager 410 stores data that includes, but is not limited to, cluster information (e.g., metadata associated with the clusters, cluster classifiers, images contained in the clusters), person instances (e.g., known/unknown), probabilities associated with the unknown person instances, person instance labels, and assigned identities.

In one or more embodiments, the data storage manager 410 communicates with the cluster manager 404 to obtain the cluster descriptions and cluster classifiers associated with each of the clusters in the image gallery 100 and to communicate the cluster information to the image analyzer 406 and the probability calculator 408. The data storage manager 410 also communicates with the image analyzer 406 to provide the image analysis information to the cluster manager 404 and the probability calculator 408 for clustering the images and determining probabilities. Additionally, the data storage manager 410 communicates with the probability calculator 408 to obtain the probabilities and use the probabilities and identification information associated with unknown person instances to update and/or otherwise modify clusters, cluster classifiers, or methods of analyzing images. The data storage manager 410 can store any or all of the information the various components of the person recognition system 402 generate for use by any of the other components.

FIGS. 1-4 describe that the person recognition system can perform clustering-based recognition processes and CRF contextual recognition processes to identify an unknown person instance as a known person instance in an image. Although FIGS. 1-4 describe using the two recognition processes together to identify one or more unknown person instances, the person recognition system can use the clustering-based recognition processes alone or in connection with another recognition method to determine an identity of one or more unknown person instances. Similarly, the person recognition system can use the CRF contextual recognition processes in connection with another type of instance-based recognition method to identify one or more unknown person instances in an image.

FIGS. 1-4, the corresponding text, and the examples, provide a number of different systems and devices for recognizing unknown people in an image gallery with increased accuracy. In addition to the foregoing, embodiments can be described in terms of flowcharts comprising acts and steps in a method for accomplishing a particular result. For example, FIGS. 5 and 6 illustrate flowcharts of exemplary methods in accordance with one or more embodiments.

Figure 5:
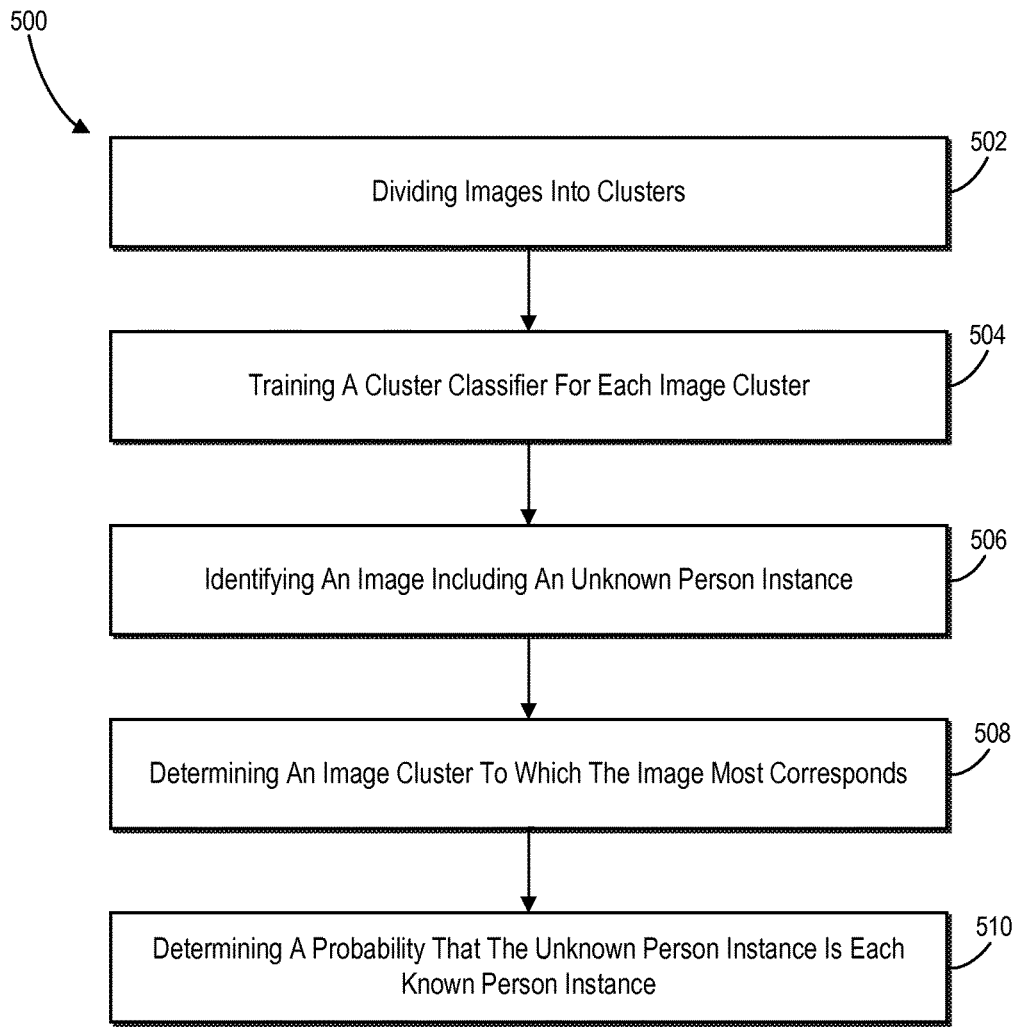
FIG. 5 illustrates a flowchart of a series of acts in a method of cluster-based person recognition in images in accordance with one or more embodiments.
Figure 6:
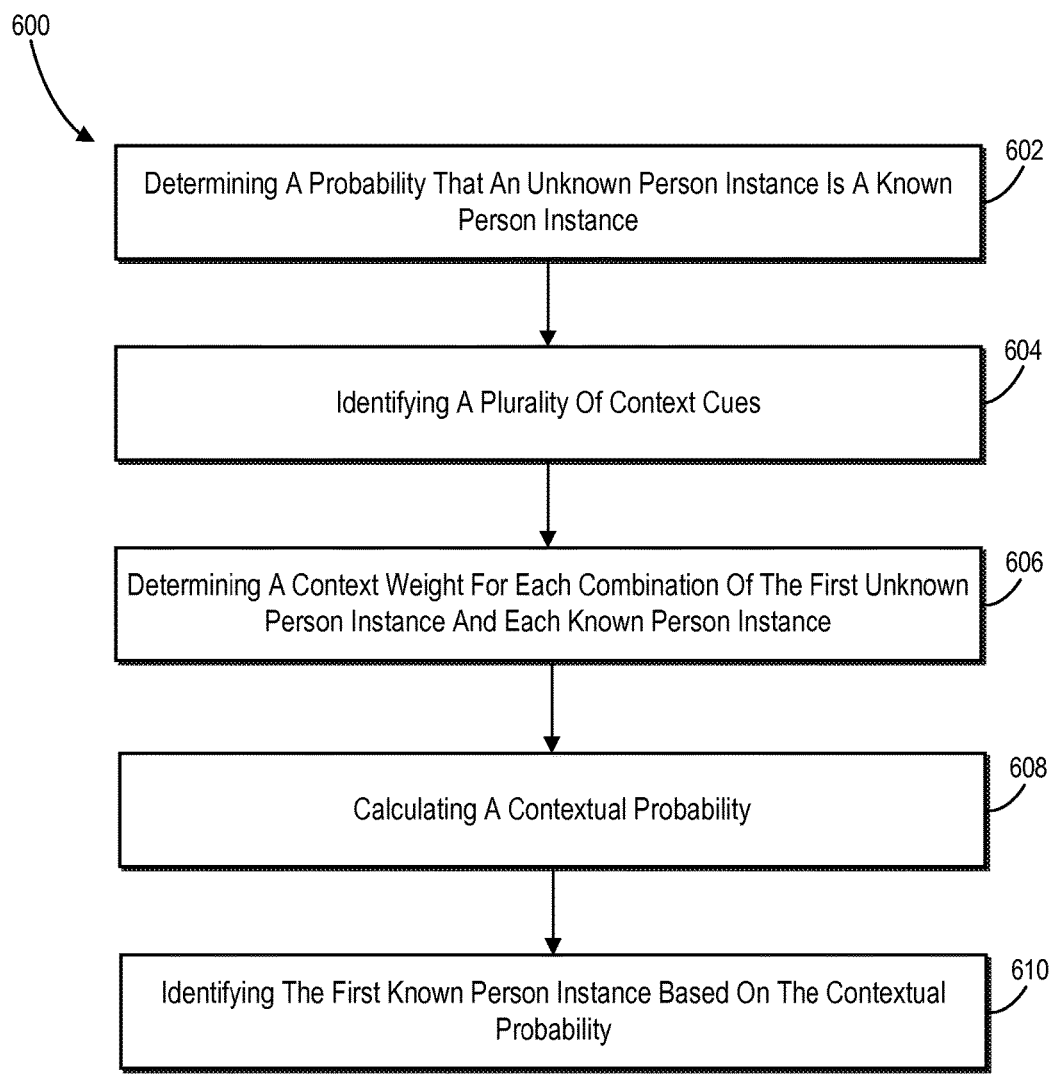
FIG. 6 illustrates a flowchart of a series of acts in a method of joint person identification in an image in accordance with one or more embodiments.

FIG. 5 illustrates a flowchart of a series of acts in a method 500 of cluster-based person recognition in images 202, 302. The method 500 includes an act 502 of dividing images into image clusters 102. For example, act 502 involves dividing images 202, 302 of an image gallery 100 into a plurality of image clusters 102, each image cluster 102 comprising a plurality of images 202, 302 from the image gallery 100 that share one or more common characteristics. To illustrate, the one or more common characteristics can include a timestamp associated with each image in the plurality of images 202, 302 in an image cluster 102. In another example, the one or more common characteristics can include visual characteristics, location, serial or sequence numbers, or timestamps.

The method 500 further includes an act 504 of training a cluster classifier 106, 206 for each image cluster. For example, act 504 involves training a cluster classifier 106, 206 for each image cluster 102 of the plurality of image clusters 102 based on a plurality of known person instances 208, 306. Act 504 can involve identifying one or more features of the plurality of known person instances 208, 306, and training the cluster classifier 106, 206 for each image cluster 102 of the plurality of image clusters 102 based on the one or more features of the plurality of known person instances 208, 306.

As part of act 504, or as an additional act, the method 500 can include an act of training a plurality of cluster classifiers 106, 206 for each cluster 102 of the plurality of clusters 102. For example, the plurality of cluster classifiers 106, 206 can include a face classifier and a body classifier.

The method 500 also includes an act 506 of identifying an image 202, 302 including an unknown person instance 200, 300. For example, act 506 can involve identifying an image 202, 302 in the image gallery 100 that does not comprise metadata associated with an identity label for a person instance in the image 202, 302. Alternatively, act 506 can involve identifying an image 202, 302 in the image gallery 100 that includes at least one person instance without metadata associated with an identity label.

Additionally, the method 500 includes an act 508 of determining an image cluster 102 to which the image most corresponds. For example, act 508 involves determining an image cluster 102 to which the image 202, 302 most corresponds based on one or more characteristics of the image and common characteristics of the plurality of image clusters 102.

Act 508 can involve determining an Euclidean distance between one or more features of the image 202, 302 and one or more features of each image cluster 102 from the plurality of image clusters 102. Additionally, act 508 can involve determining a probability that the image corresponds to each image cluster 102 from the plurality of image clusters 102 based on the determined Euclidean distance, and assigning the image 202, 302 to an image cluster 102 with the highest determined probability.

The method 500 also includes an act 510 of determining a probability that the unknown person instance 200, 300 is each known person instance 208, 306. For example, act 510 involves determining a probability that the unknown person instance 200, 300 is each known person instance 208, 306 in the image cluster 102 using the cluster classifier 106, 206 of the image cluster 102. To illustrate, act 510 can involve determining a probability that the unknown person instance 200, 300 is each known person instance 208, 306 from the plurality of known person instances in the image cluster 102 based on one or more features associated with the plurality of known person instances 208, 306.

As part of act 510, or as an additional act, the method 500 can include an act of determining a probability that the unknown person instance 200, 300 is each known person instance 208, 306 for a plurality of image clusters 102. For example, the method 500 can include determining a probability that the unknown person instance 200, 300 is each known person instance 208, 306 for a predetermined number of image clusters 102. Alternatively, the method 500 can include determining a probability that the unknown person instance 200, 300 is each known person instance 208, 306 for image clusters 102 that have a determined Euclidean distance that meets a threshold.

The method 500 can also include identifying a second image including an unknown person instance 200, 300, and determining an image cluster 102 to which the second image most corresponds based on one or more characteristics of the second image and common characteristics of the plurality of image clusters 102. The method 500 can include determining that the cluster classifier 106, 206 of the image cluster 102 does not generate a probability that the second unknown person instance 200, 300 is a known person instance 208, 306 in the image cluster 102, and determining a probability that the unknown person instance 200, 300 is a known person instance 208, 306 in the image gallery 100 using a global classifier 104 for the image gallery 100.

The method 500 can also include an act of determining a probability that the unknown person instance 200, 300 is each known person instance 208, 306 in the image cluster 102 for each cluster classifier 106 from a plurality of cluster classifiers 106, 206 of the image cluster 102. Additionally, the method 500 can include determining a combined probability by generating a weighted average of the probabilities that the unknown person instance 200, 300 is each known person instance 208, 306 in the image cluster 102 for the plurality of cluster classifiers 106, 206, for which the sum of the weight is one.

FIG. 6 illustrates a flowchart of a series of acts in a method 600 of contextual person recognition in an image. The method 600 includes an act 602 of determining a probability that an unknown person instance 200, 300 is a known person instance 208, 306. For example, act 602 involves determining a probability that a first unknown person instance 200, 300 in an image 202, 302 is each of a plurality of known person instances 208, 306 from images in an image gallery 100. Act 602 can involve determining a probability that a first unknown person instance 200, 300 in an image 202, 302 is each of a plurality of known person instances 208, 306 from images in an image cluster 102 of the image gallery 100. For example, act 602 can involve determining the probability using a cluster classifier 106, 206 from the image cluster 102.

The method 600 also includes an act 604 of identifying a plurality of context cues. For example, act 604 involves identifying a plurality of context cues between one or more of the first unknown person instance 200, 300 and one or more known person instances 208, 306 of the plurality of known person instances 208, 306 or between known person instances 208, 306 of the plurality of known person instances 208, 306. The plurality of context cues can include a mutual exclusion context cue indicating that a single person instance can only appear once in an image 202, 302. The plurality of context cues can include a person co-occurrence context cue indicating that known person instances 208, 306 appearing together in an image have an increased probability of appearing together in other images.

Additionally, the method 600 includes an act 606 of determining a context weight for each combination of the first unknown person instance 200, 300 and each known person instance 208, 306. For example, act 606 involves determining a context weight for each combination of the first unknown person instance 200, 300 and each known person instance 208, 306 from the plurality of known person instances 208, 306 using a conditional random field algorithm based on the identified plurality of context cues.

Act 606 can involve constraining each known person instance from the one or more known person instances 208, 306 to occur at most once in the image 202, 302. To illustrate, act 606 can involve determining the context weight for each combination in connection with a mutual exclusion context cue.

Act 606 can involve determining that a first known person instance from the one or more known person instances 208, 306 and a second known person instance from the one or more known person instances 208, 306 appear together in the images of the image gallery 100. Act 606 can also involve boosting a probability that the first known person instance and the second known person instance will appear together in additional images added to the image gallery 100. For example, act 606 can involve determining the context weight for each combination in connection with a person co-occurrence context cue.

The method 600 further includes an act 608 of calculating a contextual probability 310. For example, act 608 involves calculating a contextual probability 310 that the first unknown person instance is each known person instance based on the determined probabilities and the determined context weights. Act 608 can involve summing the determined probabilities and the determined context weights. Alternatively, act 608 can involve converting the context weights to a probability value by multiplying the context weights by a normalization term.

The method 600 also includes an act 610 of identifying the first known person instance based on the contextual probability 310. For example, act 610 involves identifying the first unknown person instance 200, 300 as a known person instance from the plurality of known person instances 208, 306 with a highest contextual probability.

The method 600 can include an act of determining a probability that a second unknown person instance in the image 202, 302 is each of the plurality of known person instances 208, 306 from images in the image gallery 100. Additionally, the method 600 can include jointly determining the context weight for each combination of the first unknown person instance 200, 300 and each known person instance from the plurality of known person instances 208, 306 and each combination of the second unknown person instance and each known person instance from the plurality of known person instances 208, 306.

The method 600 can further include an act of updating the context cues based on the identified first unknown person instance 200, 300, and identifying a second unknown person instance in the image 202, 302 based on the updated context cues. For example, the method 600 can include performing a plurality of iterations of determining the context weight based on the updated context cues. To illustrate, the method 600 can include updating the context weight after each iteration from the plurality of iterations.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 7:
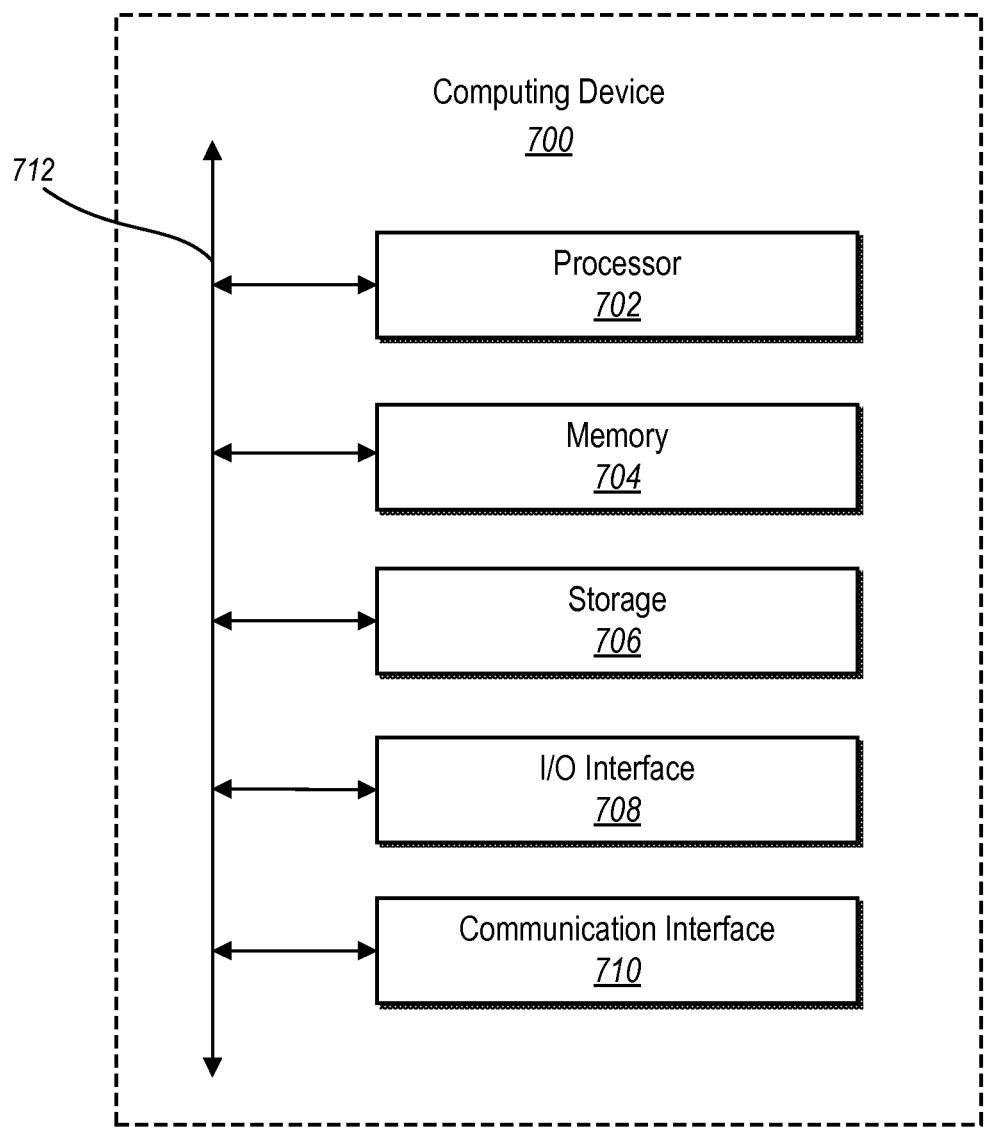
FIG. 7 illustrates a block diagram of an exemplary computing device in accordance with one or more embodiments.

FIG. 7 illustrates a block diagram of exemplary computing device 700 that may be configured to perform one or more of the processes described above. One will appreciate that one or more computing devices such as the computing device 700 may implement the person recognition system. As shown by FIG. 7, the computing device 700 can comprise a processor 702, a memory 704, a storage device 706, an I/O interface 708, and a communication interface 710, which may be communicatively coupled by way of a communication infrastructure 712. While an exemplary computing device 700 is shown in FIG. 7, the components illustrated in FIG. 7 are not intended to be limiting. Additional or alternative components may be used in other embodiments. Furthermore, in certain embodiments, the computing device 700 can include fewer components than those shown in FIG. 7. Components of the computing device 700 shown in FIG. 7 will now be described in additional detail.

In one or more embodiments, the processor 702 includes hardware for executing instructions, such as those making up a computer program. As an example and not by way of limitation, to execute instructions, the processor 702 may retrieve (or fetch) the instructions from an internal register, an internal cache, the memory 704, or the storage device 706 and decode and execute them. In one or more embodiments, the processor 702 may include one or more internal caches for data, instructions, or addresses. As an example and not by way of limitation, the processor 702 may include one or more instruction caches, one or more data caches, and one or more translation lookaside buffers (TLBs). Instructions in the instruction caches may be copies of instructions in the memory 704 or the storage 706.

The memory 704 may be used for storing data, metadata, and programs for execution by the processor(s). The memory 704 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 704 may be internal or distributed memory.

The storage device 706 includes storage for storing data or instructions. As an example and not by way of limitation, storage device 706 can comprise a non-transitory storage medium described above. The storage device 706 may include a hard disk drive (HDD), a floppy disk drive, flash memory, an optical disc, a magneto-optical disc, magnetic tape, or a Universal Serial Bus (USB) drive or a combination of two or more of these. The storage device 706 may include removable or non-removable (or fixed) media, where appropriate. The storage device 706 may be internal or external to the computing device 700. In one or more embodiments, the storage device 706 is non-volatile, solid-state memory. In other embodiments, the storage device 706 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 708 allows a user to provide input to, receive output from, and otherwise transfer data to and receive data from computing device 700. The I/O interface 708 may include a mouse, a keypad or a keyboard, a touch screen, a camera, an optical scanner, network interface, modem, other known I/O devices or a combination of such I/O interfaces. The I/O interface 708 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 708 is configured to provide graphical data to a display for presentation to a user. The graphical data may be representative of one or more graphical user interfaces and/or any other graphical content as may serve a particular implementation.

The communication interface 710 can include hardware, software, or both. In any event, the communication interface 710 can provide one or more interfaces for communication (such as, for example, packet-based communication) between the computing device 700 and one or more other computing devices or networks. As an example and not by way of limitation, the communication interface 710 may include a network interface controller (NIC) or network adapter for communicating with an Ethernet or other wire-based network or a wireless NIC (WNIC) or wireless adapter for communicating with a wireless network, such as a WI-FI.

The communication interface 710 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 710 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 710 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 712 may include hardware, software, or both that couples components of the computing device 700 to each other. As an example and not by way of limitation, the communication infrastructure 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A method of identifying people in digital images using cluster-based person recognition comprising:
    dividing, by at least one processor, images of an image gallery into a plurality of image clusters, each image cluster comprising a plurality of images from the image gallery that share one or more common characteristics, the one or more characteristics comprising one or more characteristics other than identities of the plurality of person instances in the images;
    training, by the at least one processor, a cluster classifier for each image cluster of the plurality of image clusters based on a plurality of known person instances;
    determining, by the at least one processor, an image cluster of the plurality of image clusters to which an image comprising an unknown person instance most corresponds based on one or more characteristics of the image and common characteristics of the determined image cluster of the plurality of image clusters, the one or more characteristics of the image comprising one or more characteristics other than an identity of the unknown person instance;
    identifying, by the at least one processor, a plurality of context cues between the unknown person instance and the plurality of known person instances or between the plurality of known person instances; and
    determining, by the at least one processor, a probability that the unknown person instance is each known person instance in the determined image cluster using the cluster classifier of the determined image cluster and the identified plurality of context cues.

2. The method as recited in claim 1, wherein determining the image cluster of the plurality of image clusters to which the image comprising the unknown person instance most corresponds comprises:
    determining an Euclidean distance between one or more features of the image and one or more features of each image cluster from the plurality of image clusters; and
    determining a probability that the image corresponds to each image cluster from the plurality of image clusters based on the determined Euclidean distance; and
    assigning the image to an image cluster with the highest determined probability.

3. The method as recited in claim 1, further comprising:
    training a plurality of cluster classifiers for each image cluster of the plurality of image clusters, each of the plurality of cluster classifiers being associated with a given image feature; and
    determining a probability that the unknown person instance is each known person instance in the image cluster based on a given image feature by using the associated cluster classifier.

4. The method as recited in claim 3, wherein the plurality of cluster classifiers comprises a face classifier and a body classifier.

5. The method as recited in claim 1, wherein determining the probability that the unknown person instance is each known person instance comprises:
    determining a context weight for a combination of the unknown person instance and a known person instance from the plurality of known person instances based on the identified plurality of context cues; and
    determining a contextual probability that the unknown person instance is the known person instance from the plurality of known person instances based on the cluster classifier of the image cluster and the determined context weight.

6. The method as recited in claim 1, further comprising:
    identifying a second image including an unknown person instance;
    determining a second image cluster of the plurality of image clusters to which the second image most corresponds based on one or more characteristics of the second image and common characteristics of the second image cluster; and
    determining a probability that the unknown person instance of the second image is a known person instance in the image gallery using a global classifier for the image gallery based on a lack of a cluster classifier for the second image cluster due to sparse training data.

7. The method as recited in claim 1, further comprising:
    identifying a second image including an unknown person instance;
    determining a second image cluster of the plurality of image clusters to which the second image most corresponds based on one or more characteristics of the image and common characteristics of the second image cluster; and
    determining a probability that the unknown person instance is a known person instance in the image gallery using a cluster classifier from an image cluster other than the second image cluster based on a lack of a cluster classifier for the second image cluster due to sparse training data.

8. The method as recited in claim 1, wherein the one or more common characteristics comprise a timestamp associated with each image in the plurality of images in an image cluster.

9. A non-transitory computer readable storage medium comprising instructions that, when executed by at least one processor, cause a computer system to:
    determine a probability that a first unknown person instance in an image is each of a plurality of known person instances from images in an image gallery;

identify a plurality of context cues between one or more of the first unknown person instance and one or more known person instances of the plurality of known person instances or between known person instances of the plurality of known person instances;

determine a context weight for each combination of the first unknown person instance and each known person instance from the plurality of known person instances using a conditional random field algorithm based on the identified plurality of context cues;

calculate a contextual probability based on the determined probabilities and the determined context weights; and identify the first unknown person instance as a known person instance from the plurality of known person instances with a highest contextual probability.

10. The non-transitory computer readable storage medium as recited in claim 9, wherein the instructions, when executed by the at least one processor, cause the computer system to determine the context weight for each combination by constraining each known person instance from the one or more known person instances to occur at most once in the image.

11. The non-transitory computer readable storage medium as recited in claim 9, wherein the instructions, when executed by the at least one processor, cause the computer system to determine the context weight for each combination by:

determining that a first known person instance from the one or more known person instances and a second known person instance from the one or more known person instances appear together in the images of the image gallery; and boosting a probability that the first known person instance and the second known person instance will appear together in additional images added to the image gallery.

12. The non-transitory computer readable storage medium as recited in claim 9, further comprising instructions that, when executed by the at least one processor, cause the computer system to:

determine a probability that a second unknown person instance in the image is each of the plurality of known person instances from images in the image gallery; and jointly determine the context weight for each combination of the first unknown person instance and each known person instance from the plurality of known person instances and each combination of the second unknown person instance and each known person instance from the plurality of known person instances.

13. The non-transitory computer readable storage medium as recited in claim 9, wherein the instructions, when executed by the at least one processor, cause the computer system to calculate the contextual probability by summing the determined probabilities and the determined context weights.

14. The non-transitory computer readable storage medium as recited in claim 9, further comprising instructions that, when executed by the at least one processor, cause the computer system to:

update the context cues based on the identified first unknown person instance; and identify a second unknown person instance in the image based on the updated context cues.

15. The non-transitory computer readable storage medium as recited in claim 9, wherein the instructions, when executed by the at least one processor, cause the computer system to identify the first unknown person instance as a known person instance from the plurality of known person instances with a highest contextual probability by determining that the highest contextual probability is above a predetermined probability threshold.

16. In a digital medium environment for identifying an unknown person in an image, a system comprising:

at least one processor; and at least one non-transitory computer-readable storage medium storing instructions thereon that, when executed by the at least one processor, cause the system to:

train a cluster classifier for each image cluster of a plurality of image clusters comprising images from an image gallery based on a plurality of known person instances;

determine a probability that a first unknown person instance is each known person instance in the image cluster using the cluster classifier of an image cluster that corresponds to the image based on one or more characteristics of the image cluster;

determine a context weight for each combination of the first unknown person instance and each known person instance from the plurality of known person instances using a conditional random field algorithm based on a plurality of context cues between one or more of the first unknown person instance and one or more known person instances of the plurality of known person instances or between known person instances of the plurality of known person instances;

calculate a contextual probability based on the determined probabilities and the determined context weights; and identify the first unknown person instance as a known person instance from the plurality of known person instances with a highest contextual probability.

17. The system as recited in claim 16, further comprising instructions that, when executed by the at least one processor, cause the system to:

train a plurality of cluster classifiers for each cluster of the plurality of clusters;

determine a probability that the first unknown person instance is each known person instance in the image cluster for each cluster classifier from the plurality of cluster classifiers of the image cluster; and determine a combined probability by generating a weighted average of the probabilities that the first unknown person instance is each known person instance in the image cluster for the plurality of cluster classifiers.

18. The system as recited in claim 16, wherein the plurality of context cues comprise:

a first context cue that constrains each known person instance from the one or more known person instances to occur at most once in the image; and a second context cue that:

determines that a first known person instance from the one or more known person instances and a second known person instance from the one or more known person instances appear together in the images of the image gallery; and boosts a probability that the first known person instance and the second known person instance will appear together in additional images added to the image gallery.

19. The system as recited in claim 16, further comprising instructions that, when executed by the at least one processor, cause the system to:

determine a probability that a second unknown person instance in the image is each of the plurality of known person instances from images in the image gallery; and jointly determine the context weight for each combination of the first unknown person instance and each known person instance from the plurality of known person instances and each combination of the second unknown person instance and each known person instance from the plurality of known person instances.

20. The system as recited in claim 16, further comprising instructions that, when executed by the at least one processor, cause the system to identify the first unknown person instance as a known person instance from the plurality of known person instances with a highest contextual probability comprises determining that the highest contextual probability is above a predetermined probability threshold.

* * * * *